United States Patent
Panchadsaram et al.

(10) Patent No.: US 8,972,418 B2
(45) Date of Patent: Mar. 3, 2015

(54) DYNAMIC GENERATION OF RELEVANT ITEMS

(75) Inventors: Ryan S. Panchadsaram, San Francisco, CA (US); Mikhail Birman, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 641 days.

(21) Appl. No.: 12/755,638

(22) Filed: Apr. 7, 2010

(65) Prior Publication Data

US 2011/0252022 A1   Oct. 13, 2011

(51) Int. Cl.
*G06F 7/00* (2006.01)
*G06F 17/30* (2006.01)

(52) U.S. Cl.
CPC .................. *G06F 17/3087* (2013.01)
USPC ......................................................... 707/751

(58) Field of Classification Search
CPC .................................................. G06F 17/3087
USPC .................................. 707/723, 748, 749, 751
See application file for complete search history.

(56) References Cited

U.S. PATENT DOCUMENTS

| | | | |
|---|---|---|---|
| 6,442,544 B1 * | 8/2002 | Kohli ..................................... | 1/1 |
| 6,980,956 B1 * | 12/2005 | Takagi et al. .................. | 704/275 |
| 6,990,653 B1 | 1/2006 | Burd et al. | |
| 7,853,622 B1 * | 12/2010 | Baluja et al. .................. | 707/803 |
| 8,176,029 B2 * | 5/2012 | Wang ............................. | 707/706 |
| 8,200,648 B2 * | 6/2012 | Boiman et al. ................ | 707/706 |
| 2003/0025728 A1 * | 2/2003 | Ebbo et al. ..................... | 345/744 |
| 2003/0074634 A1 | 4/2003 | Emmelmann | |
| 2003/0154293 A1 * | 8/2003 | Zmolek .......................... | 709/228 |
| 2003/0177175 A1 * | 9/2003 | Worley et al. ................. | 709/203 |
| 2004/0030719 A1 | 2/2004 | Wei | |
| 2004/0137911 A1 * | 7/2004 | Hull et al. .................. | 455/456.1 |
| 2005/0159998 A1 * | 7/2005 | Buyukkokten et al. ......... | 705/11 |
| 2005/0273487 A1 | 12/2005 | Mayblum et al. | |
| 2006/0041663 A1 * | 2/2006 | Brown et al. .................. | 709/226 |
| 2006/0101005 A1 * | 5/2006 | Yang et al. ........................ | 707/3 |
| 2006/0129635 A1 | 6/2006 | Baccou et al. | |
| 2007/0061412 A1 | 3/2007 | Karidi et al. | |
| 2007/0282698 A1 * | 12/2007 | Huberman et al. ............. | 705/26 |
| 2007/0288437 A1 * | 12/2007 | Xia ................................. | 707/3 |
| 2008/0070209 A1 * | 3/2008 | Zhuang et al. ................ | 434/236 |
| 2008/0228786 A1 * | 9/2008 | Svanteson et al. ............ | 707/100 |
| 2008/0275719 A1 * | 11/2008 | Davis et al. ........................ | 705/1 |
| 2008/0294682 A1 | 11/2008 | Bernstein et al. | |
| 2008/0320438 A1 * | 12/2008 | Funto et al. ................... | 717/106 |

(Continued)

OTHER PUBLICATIONS

Jensen, et al., "Location-Based Services—A Database Perspective,", Retrieved at << http;//citeseerx.ist.psu.edu/viewdoc/download-?doi=10.1.1.78.459&rep=rep1&type=pdf >>, 2001 pp. 10.

(Continued)

*Primary Examiner* — Rehana Perveen
*Assistant Examiner* — Mark E Hershley
(74) *Attorney, Agent, or Firm* — Joann Dewey; Jim Ross; Mickey Minhas (57) ABSTRACT

Various embodiments dynamically generate relevant items for a user based on a user's location and an item's popularity. In at least some embodiments, a probability component generates a ranked list of items that are relevant to users at a particular location using probability data associated with the list of items and the particular location. The probability data is based on user selections of items in the list of items.

20 Claims, 6 Drawing Sheets

(56) References Cited

U.S. PATENT DOCUMENTS

| | | | |
|---|---|---|---|
| 2009/0024601 A1* | 1/2009 | Zmolek | 707/4 |
| 2009/0119173 A1* | 5/2009 | Parsons et al. | 705/14 |
| 2009/0138421 A1* | 5/2009 | Ansari et al. | 706/25 |
| 2009/0138472 A1* | 5/2009 | MacLean | 707/7 |
| 2009/0157523 A1* | 6/2009 | Jones et al. | 705/26 |
| 2009/0204482 A1* | 8/2009 | Reshef et al. | 705/10 |
| 2009/0234909 A1* | 9/2009 | Strandell et al. | 709/203 |
| 2009/0327816 A1* | 12/2009 | Takata et al. | 714/46 |
| 2010/0076847 A1* | 3/2010 | Heller | 705/14.53 |
| 2010/0121707 A1* | 5/2010 | Goeldi | 705/14.49 |
| 2010/0121849 A1* | 5/2010 | Goeldi | 707/736 |
| 2010/0121857 A1* | 5/2010 | Elmore et al. | 707/748 |
| 2010/0128105 A1* | 5/2010 | Halavy | 348/14.05 |
| 2010/0241507 A1* | 9/2010 | Quinn et al. | 705/14.42 |
| 2010/0257183 A1* | 10/2010 | Kim et al. | 707/748 |
| 2010/0332326 A1* | 12/2010 | Ishai | 705/14.58 |
| 2011/0022602 A1* | 1/2011 | Luo et al. | 707/748 |
| 2011/0113086 A1* | 5/2011 | Long et al. | 709/203 |
| 2011/0154497 A1* | 6/2011 | Bailey, Jr. | 726/25 |
| 2011/0173068 A1* | 7/2011 | O'Hanlon | 705/14.52 |
| 2011/0196922 A1* | 8/2011 | Marcucci et al. | 709/204 |
| 2012/0150777 A1* | 6/2012 | Setoguchi et al. | 706/14 |

OTHER PUBLICATIONS

Challenger, et al., "Efficiently Serving Dynamic Data at Highly Accessed Web Sites", Retrieved << http://citeseerx.ist.psu.edu/viewdoc/download?doi=10.1.1.11.362&rep=rep1&type=pdf>>, IEEE/ACM Transactions on Networking, vol. 12, No. 2, Apr. 2004, pp. 233-246.

Naaman, Mor et al., "Evaluation of Delivery Techniques for Dynamic Web Content", WWW 2003, Available at<http://citeseerx.ist.psu.edu/viewdoc/download?doi=10.1.1.101.7877&rep=rep1&type=pdf>,(May 2003),12 pages.

* cited by examiner

DYNAMIC GENERATION OF RELEVANT ITEMS

BACKGROUND

Some websites include user interfaces that are configured to display lists or groups of items that can be selected or interacted with by users. Oftentimes these lists can include hundreds or even thousands of different items. With limited screen space available on computing devices to display items, web site editors would like to provide different users with relevant items as opposed to items that are less relevant. Similarly, users would like to be presented with a relevant list of items, rather than items that are less relevant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments dynamically generate relevant items for a user based on a user's location and an item's popularity. In at least some embodiments, a probability component generates a ranked list of items that are relevant to users at a particular location using probability data associated with the list of items and the particular location. The probability data is based on user selections of items in the list of items.

In at least some embodiments, the probability component receives a request for a list of items from a client device and determines a location associated with the client device. The probability component then determines whether probability data for the list of items is available for the location associated with the client device. The probability data is based on selections of items in the list of items from sources other than the client device. Responsive to determining that probability data is available, the probability component generates a ranked list of items using the probability data associated with the location of the client device. The probability component then transmits the list of items to the client device for display.

In at least some embodiments, the probability component is configured to update probability data for items in a list of items based on user selections of items in the list. Responsive to receiving a user selection of an item in the list of items, the probability component increases a probability associated with the selected item and decreases probabilities associated with other items in the list of items.

BRIEF DESCRIPTION OF THE DRAWINGS

The same numbers are used throughout the drawings to reference like features.

DETAILED DESCRIPTION

Overview

Some websites include user interfaces that are configured to display items that can be selected or interacted with by users. A social media user interface, for example, can be configured to display items associated with social media web sites (e.g., Facebook, Twitter, MySpace, and LinkedIn) that can be selected to navigate to a respective social media web site. Today, there are literally hundreds of social media web sites, with more being created all the time. With limited available screen space on computing devices to display items, web site editors would like to configure websites to dynamically select and provide items in a list or grouping of items that are most relevant to users. However, the relevancy of items can vary at different geographic locations. Social media web sites, for instance, can fluctuate in popularity for users at different geographic locations. For example, users in Seattle may use Facebook more frequently than users in Wyoming who might prefer MySpace. It can be difficult, therefore, for web site editors to automatically provide and display a relevant list of items that match usage patterns for users at varying locations. It is to be appreciated and understood that while social media websites are used as examples throughout this document, the inventive techniques can be applied to items associated with other websites without departing from the spirit and scope of the claimed subject matter.

Various embodiments dynamically generate relevant items for a user based on a user's location and an item's popularity. In at least some embodiments, a probability component generates a ranked list of items that are relevant to users at a particular location using probability data associated with the list of items and the particular location. The probability data is based on user selections of items in the list of items.

In at least some embodiments, the probability component receives a request for a list of items from a client device and determines a location associated with the client device. The probability component then determines whether probability data for the list of items is available for the location associated with the client device. The probability data is based on selections of items in the list of items from sources other than the client device. Responsive to determining that probability data is available, the probability component generates a ranked list of items using the probability data associated with the location of the client device. The probability component then transmits the list of items to the client device for display.

In at least some embodiments, the probability component is configured to update probability data for items in a list of items based on user selections of items in the list. Responsive to receiving a user selection of an item in the list of items, the probability component increases a probability associated with the selected item and decreases probabilities associated with other items in the list of items.

In the discussion that follows, a section entitled "Operating Environment" describes but one operating environment that can be utilized to practice the inventive principles described herein, in accordance with one or more embodiments. Following this, a section entitled "Probability Component" is provided and describes an example probability component in accordance with one or more embodiments. Next, a section entitled "Example Method" describes an example method in accordance with one or more embodiments. Last, a section entitled "Example System" describes an example system that can be utilized to implement the described embodiments.

Operating Environment

Figure 1:
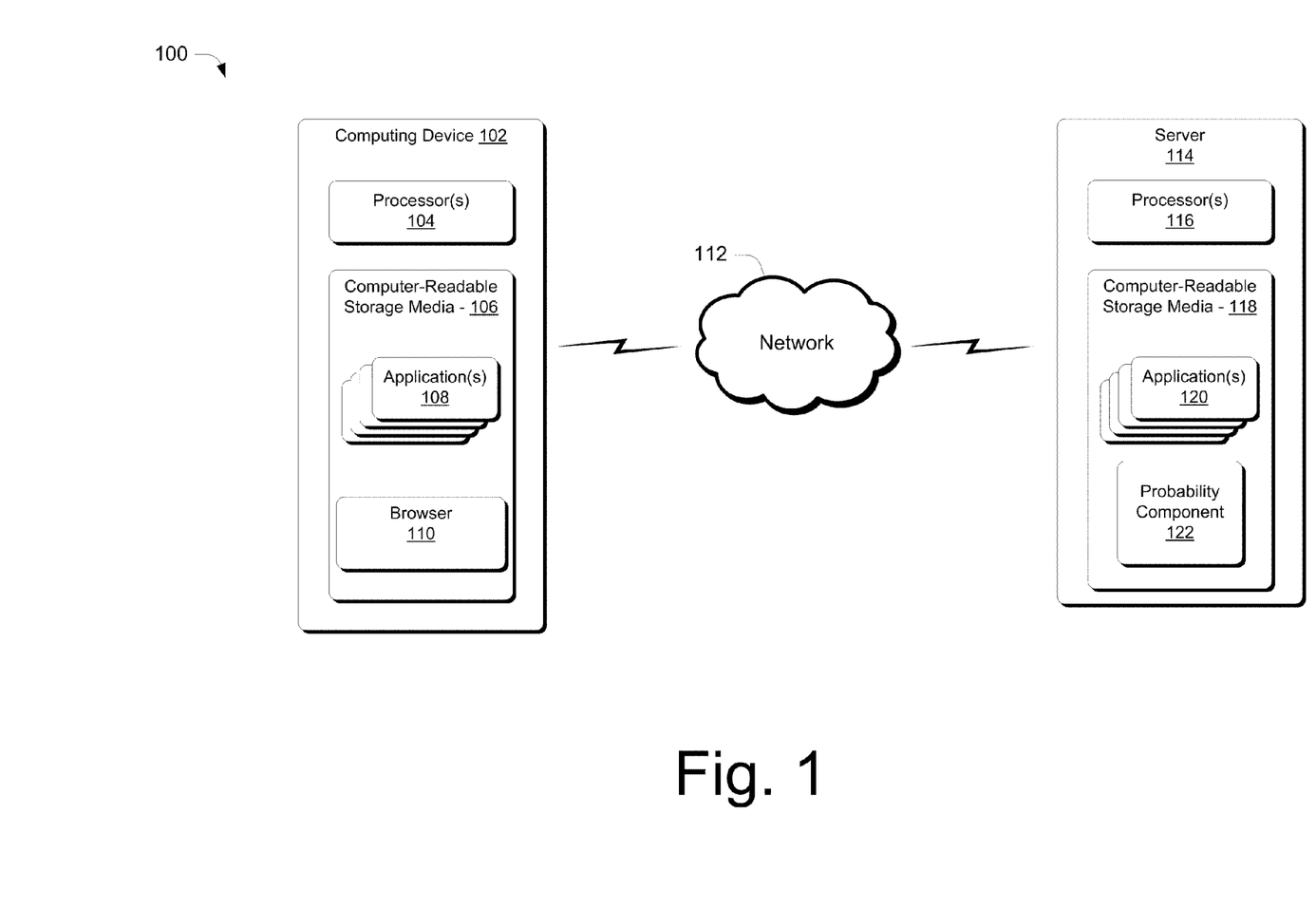
FIG. 1 illustrates an operating environment in accordance with one or more embodiments.

FIG. 1 illustrates an operating environment in accordance with one or more embodiments, generally at 100. Operating environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes a software application in the form of a web browser 110. Any suitable web browser can be used examples of which are available from the assignee of this document and others.

In addition, environment 100 includes a network 112, such as a local network or the Internet, and one or more servers 114 via which information can be requested and sent. Server 114 includes one or more processors 116, one or more computer-readable storage media 118 and one or more applications 120 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device that can implement a server is shown and described below in FIG. 6.

In addition, server 114 also includes a probability component 122 that operates as described above and below. Probability component 122 can be implemented as a standalone component or one that is integrated with other applications. In operation, the probability component can be used to dynamically generate relevant items for a user based on a user's location and an item's popularity, as will become apparent below.

Computing device 102 can be embodied as any suitable computing device such as, by way of example and not limitation, a desktop computer, a portable computer, a handheld computer such as a personal digital assistant (PDA), cell phone, and the like.

Having discussed the general notion of an example operating environment in which various embodiments can operate, consider now a more detailed discussion of a probability component in accordance with one or more embodiments.

Probability Component

A probability component, such as probability component 122 illustrated in FIG. 1, can generate a ranked list of items that are relevant to users at a particular location. It can do so using probability data associated with the list of items and the particular location. The probability data is based on previous user selections of items that can appear in the list of items. As described throughout, an item "selection" can include any selection, action, or interaction with an item by a user. An "item" can refer to any selectable item, button, link, or control that can be selected by a user on a computing device display. Items of the same type, or that share one or more similar characteristics, can be grouped into lists. For example, a list of items based on a type of item can include, by way of example and not limitation, a list of restaurants, a list of sports web sites (e.g., www.espn.com, www.cnnsi.com, and www.cbssports.com), a list of movie theatres, a list of shopping web sites, or a list of products (e.g., shoes, books, and cars). A list of items based on a shared characteristic could include, by way of example and not limitation, a list of movie theatres, restaurants, bars, and cafes located in Seattle. In at least some embodiments, a list of items can include a list of social media web sites, such as Facebook, Twitter, or LinkedIn, and the like.

Probability Data

In accordance with various embodiments, the probability component can create and update probability data for items that appear in the list of items. In the illustrated and described embodiments, probability data can be created and updated based on user selections of items that appear in the list. The probability component can increase a probability associated with an item when the item is selected and decrease the item's probability when the item is not selected. As described throughout, the probability associated with an item is a measure of the likelihood that an item will be selected by the probability component when generating a ranked list of items. Probabilities can be represented in decimal form (e.g., 0.5) or in percentage form (e.g., 50%), but will be discussed as percentages herein. The total probability for items in a list typically adds up to 100%. Therefore, it is to be appreciated that when the probability of one item in a list of items increases, the probability or probabilities of other item(s) in the list decreases so that the total probability remains at 100%. For example, if a first item and a second item both have probabilities of 50%, and the probability of the first item increases to 75%, the probability of the second item decreases to 25%.

Prior to receiving a user's item selection, the probability component assigns an equal probability to each item in a particular list. This ensures that when the probability component generates a ranked list, each item in the list will have an equal chance of being selected at the top of the list. As an example, consider FIG. 2. There, a graph is shown generally at 200 and includes initial item probabilities before any user selections are received. Graph 200 includes a horizontal line 202 indicating that $Item_1$ through $Item_n$ have the same probability of being selected by the probability component. Consider for example, that if there are 100 items in an associated list, each item will have a 1% chance of being selected by the probability component because the total probability adds up to 100%.

Figure 2:
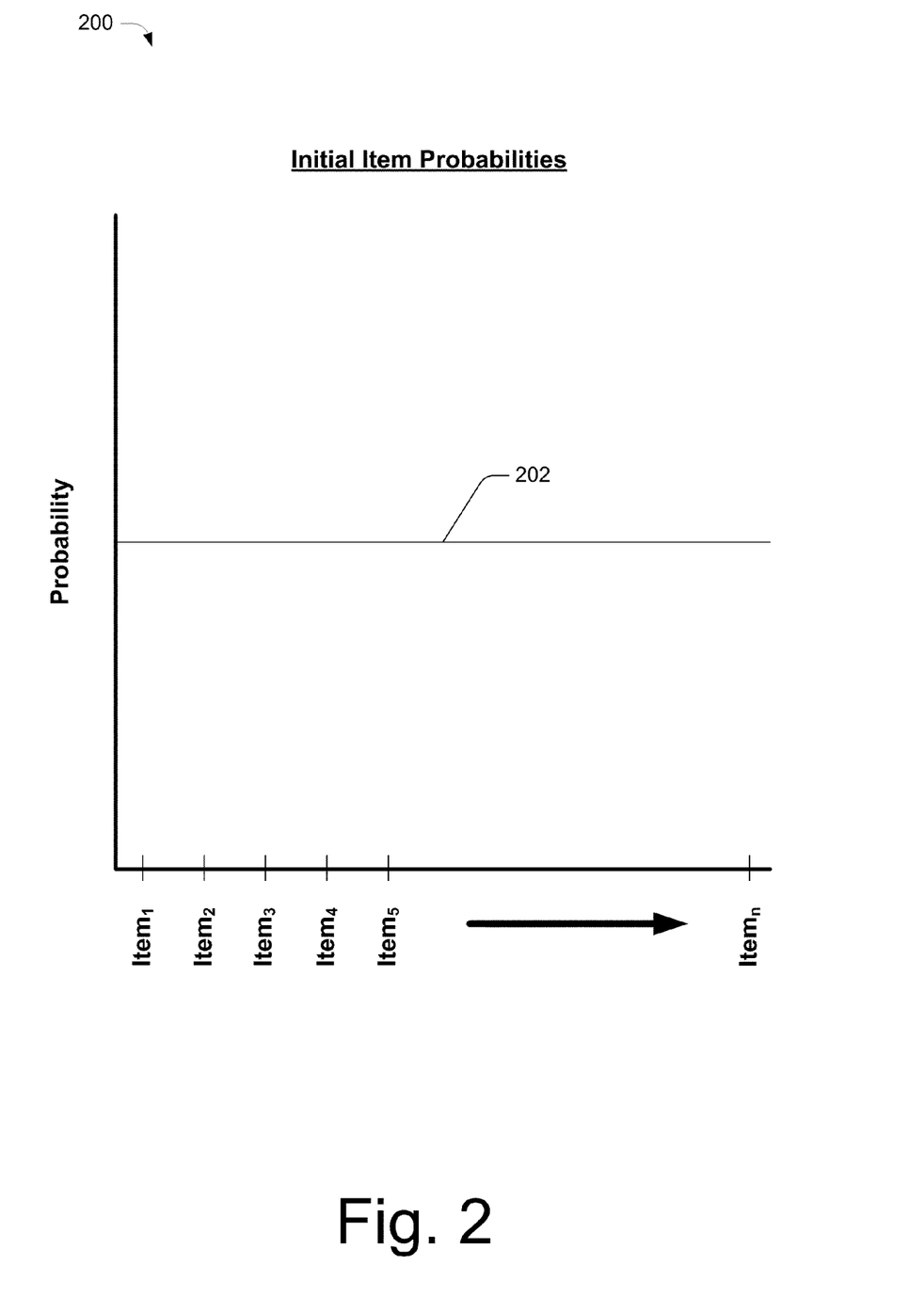
FIG. 2 illustrates an example graph of initial item probabilities in accordance with one or more embodiments.
Figure 3:
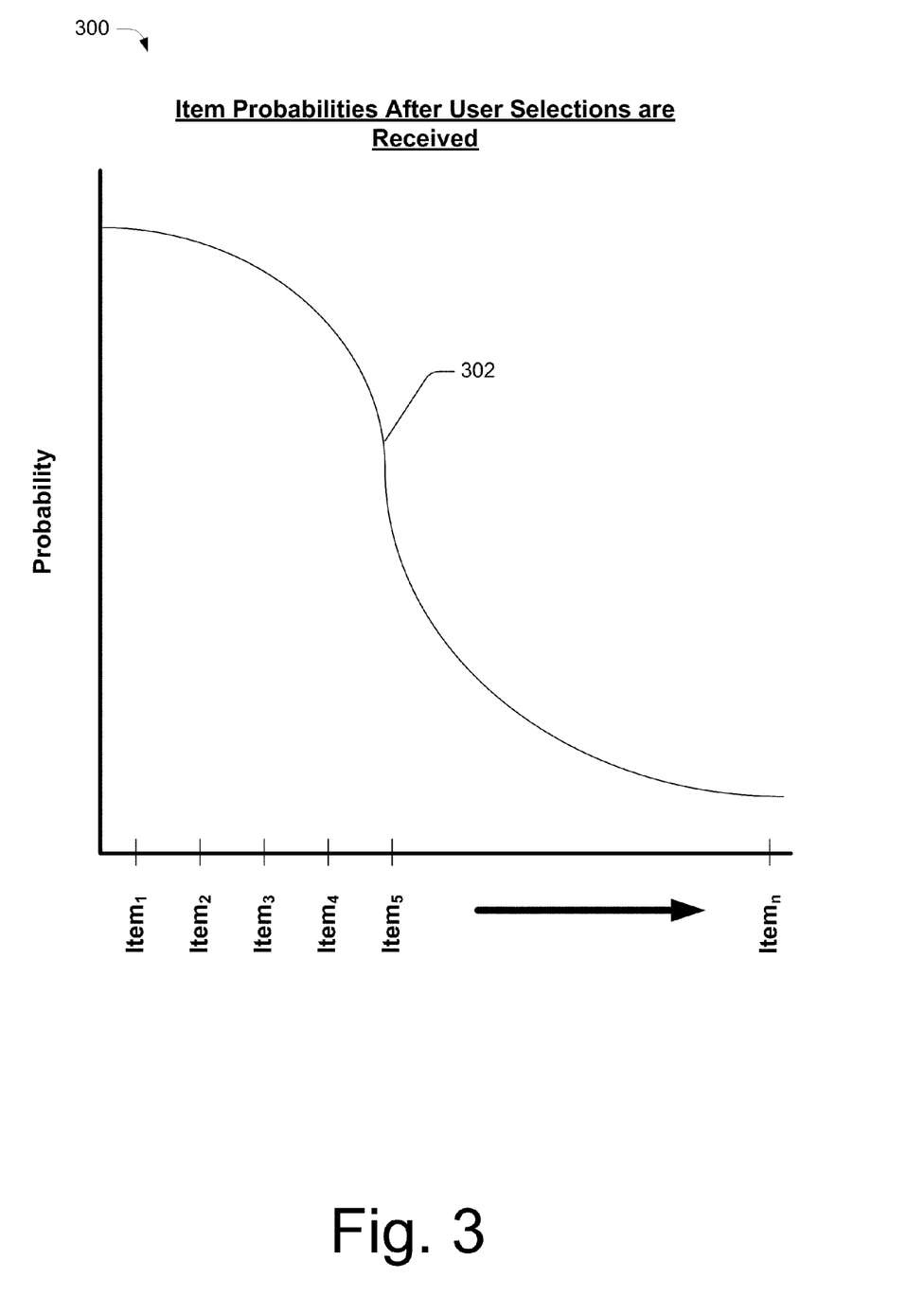
FIG. 3 illustrates an example graph of item probabilities after user selections are received in accordance with one or more embodiments.

In accordance with various embodiments, responsive to receiving a user's item selection, the probability component increases the probability of the selected item and decreases the probabilities of other items in the list. As an example, consider FIG. 3. There, a graph is illustrated generally at 300 and includes item probabilities after user selections of items have been received by the probability component. In contrast to the horizontal line of graph 200, graph 300 includes a power law distribution curve 302 indicating that $Item_1$ through $Item_n$ have a higher probability of being selected than $Item_n$. It is to be appreciated, therefore, that items that are frequently selected by users will have higher probabilities than items that are rarely selected.

When generating a ranked list of items, therefore, the probability component is more likely to place items that are frequently selected at the top of the list by virtue of the fact that items that are frequently selected will have higher probabilities. However, because the probability component uses probabilities to generate ranked lists, it is theoretically possible for items with lower probabilities to be ranked at the top of the list. In other words, the fact that an item has a low associated probability does not guarantee that the item will be ranked near the bottom of the list. The low probability simply decreases the likelihood that the item will be ranked at the top of the list. Furthermore, if an item with a low probability is placed at the top of a ranked list, and subsequently is selected or interacted with, the item's associated probability will increase thereby increasing the likelihood that the item will be selected again.

In accordance with various embodiments, the probability component can create and update item probabilities for multiple different locations. For example, when an item selection from a user is received, the probability component can determine a location associated with the user or the user's device. Any suitable technique can be utilized to ascertain the user's location, examples of which are provided below. The probability component can then update the probability of the selected item and other items in the list for the specific location of the user. In other words, an item selection by a user in a particular location can cause the probability component to update the probability of the selected item for the particular location. Therefore, when the probability component generates a ranked list of items for a user associated with a particular location, the list can be ranked based on previous item selections by users associated with the same location as the user. In this way, the list of items can be tailored to a user at a specific location based on what items other users at the same location have previously selected.

In various embodiments, the probability component can update item probabilities for multiple regions or sub-regions associated with a location of a client device. Consider, for example, that the probability component receives an item selection from a client device located at a specific address in the Queen Anne neighborhood of Seattle, Wash. The probability component can update probabilities associated with the selected item for a variety of different regions associated with the specific location, such as the specific address, the Queen Anne neighborhood, the city of Seattle, Wash. State, the West Coast, and the United States. In this way, probabilities can be associated with regions or sub-regions at different levels of granularity.

Client Requests

In accordance with various embodiments, a client device, such as device 102, can request a list of items. This request can be performed, for example, by a user on a client device who navigates to a web page via a web browser. Consider for example, FIG. 4, which illustrates an example web browser user interface 400 comprising part of a web browser that can be executed on a client device to facilitate navigation to and from various web sites. In this example, web browser user interface 400 has been navigated to www.msn.com and is displaying a web page 402. Web page 402 includes an item display area 404 in which Item 1 to Item 5 are displayed at 406, 408, 410, 412, and 414, respectively. Item display area 404 can be embodied as any type of web page user interface that is configured to display items.

Figure 4:
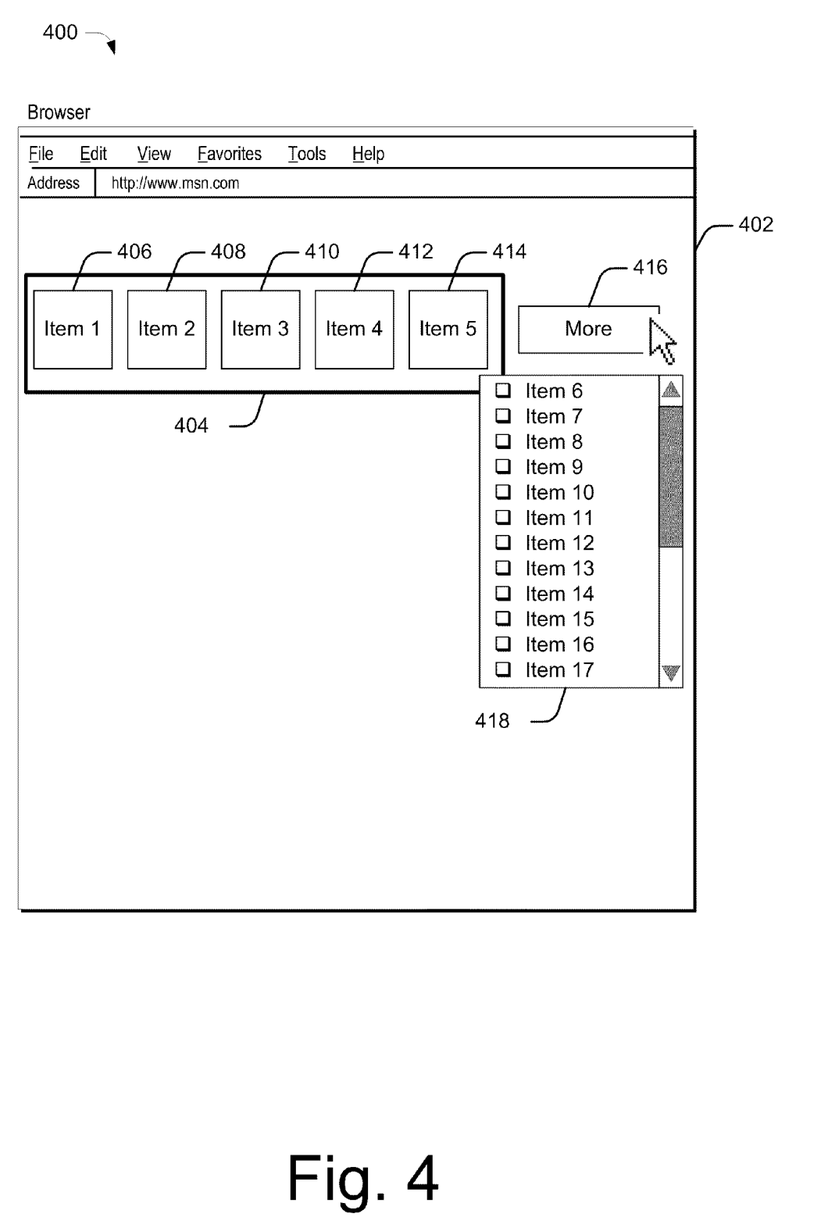
FIG. 4 illustrates an example web browser displaying a list of items in an item display area in accordance one or more embodiments.

In at least some embodiments, the item display area is configured to display a limited number of items in a list of items. In FIG. 4, for example, item display area 404 is configured to display just five items from the list of items. It is to be appreciated of course that that item display area 404 can be configured to display any number of items.

In at least some embodiments, item display area 404 can be embodied as a social toolbar that is configured to display indications in the form of links to various social media websites, such as Facebook, Twitter, and LinkedIn to enable users to quickly and efficiently navigate to their favorite social media web sites. As noted above, when a user navigates to a website that includes an item display area, the probability component can cause the item display area to be populated with the relevant items.

Determining a Location of a Client Device

As discussed above, the probability component can determine a location associated with a client device responsive to receiving a request for a list of items from the client device. The location associated with a client device can be used by the probability component to provide the client with a list of items that is tailored to the specific location associated with the client device and/or a location associated with a user of the client device.

The probability component can determine a location of a client device in a variety of different ways, including, by way of example and not limitation, using a user-specified location, GPS data, or an IP address of the client device. For example, a user can manually provide user-specified location data (e.g., a specific country, state, city, or address), as part of a request, to the probability component. Alternately or additionally, a client device equipped with GPS sensors can transmit GPS data, as part of the request, to the probability component so that the probability component can determine a current location of the client device that changes as the user and/or client device changes locations.

In at least some embodiments, the probability component can determine a location associated with a user of the client device that may not be the actual current location of the user and/or the client device. For instance, the probability component can receive and save a user-specified location associated with a user so that the user-specified location does not change as the user and/or client device changes locations. Consider for example, that a user from California could set a home location to be California so that even if the user travels to Europe with his laptop, the probability component will determine the location associated with the user to be California.

Selecting Probability Data

Responsive to determining a location associated with a client device, the probability component can determine, through a search, whether probability data is available for the determined location. In some cases, however, the specific location may be very precise, such as a specific address, and probability data may be unavailable. In these instances, the probability component can use various alternatives to discover probability data. As described above, items may have associated probability data for specific regions (e.g., countries), as well as sub-regions within the specific regions (e.g., states, counties, cities, and neighborhoods within the specific region).

Therefore, in accordance with various embodiments, if probability data associated with the determined location of a client device is not available, the probability component can zoom out to a less specific, or more general location or region. The probability component can then determine whether probability data associated with the less specific location or region is available. For example, if the probability component determines that probability data is not available for the specific Queen Anne neighborhood location of a client device, the probability component can zoom out to a less specific region, such as the city of Seattle. The probability component then determines whether probability data is available for the city of Seattle. If probability data is unavailable for Seattle, the probability component can again zoom out and search for probability data at a less specific region such as the state of Washington. This process can continue until the probability component finds probability data.

Generating a Ranked List of Items

As noted above, the probability component can generate a ranked list of items using probability data associated with a location of a client device. Since the probability data is based on user selections by users associated with a same or similar location as the user, the probability component can provide the user with a list of items that is tailored to the location associated with the user.

In accordance with various embodiments, the probability component can generate a ranked list of items by selecting items from a list of items using probability values associated with each item until all of the items have been placed in the ranked list. Items with high probability values, therefore, have a greater likelihood of being included higher in the ranked list than items with low probability values. For example, an item with a probability value of 50% has a much better chance of being selected first in the ranked list than an item with a probability value of 1%.

After generating a ranked list of items, the probability component transmits the ranked list to a client device. For example, in FIG. 1, probability component 122 at server 114 can transmit a ranked list of items via network 112 to computing device 102.

User Selections of Items

Responsive to receiving the ranked list of items, the client device can display the ranked list of items in an item display area, such as the one described above. At web page 402 (FIG. 4), for example, a ranked list of items is displayed in item display area 404. In at least some embodiments, there may be limited space available to display items in the item display area. For example, item display area 404 has limited space to display just five items. The item display area can be configured to fill the limited spaces in the display area by sequentially selecting items from the top of the list and placing the selected items in the item display area until the item display area is filled with items.

The client device can receive user selections of items from the item display area. In FIG. 4 for example, a user can select Item 1, Item 2, Item 3, Item 4, and/or Item 5 from item display area 404 using a cursor. In this example, notice that a user's cursor has selected a more control 416 which causes a scrollable display list of items 418 to be displayed. Scrollable display list of items 418 is configured to display other items from the list of items that are not currently displayed in the display area because they were not ranked high enough in the generated ranked list of items. While users can still access items in the scrollable display list, it may be less likely that users will select these items over items displayed in the display area. After receiving a user selection of an item, the client device can transmit the user selection to the probability component.

Updating Probability Data

The probability component can update probability data responsive to receiving user selections of items. In at least some embodiments, the probability component updates probability data by increasing a selected item's probability and decreasing the probability of other items in a list, as discussed above. The probability component can update probability data in real time as user selections are received to ensure that the probability data is current. The effect of a user selection of an item on the selected item's probability can vary. It is to be appreciated that the effect of a user selection of an item at a particular location may be based, at least in part, on the number of previous user selections at the particular location. For instance, in a specific location or region where there have been a limited number of previous user selections, the user selection may greatly increase the selected item's probability. Alternately, in more general locations or regions where there have been many previous user selections, the user selection may only slightly increase the selected item's probability. For example, a user selection of an item by a user associated with Seattle may increase the selected item's probability by 1% for Seattle, and have a negligible effect on the item's probability for Washington State because there may be more previous user selections associated with the larger region of Washington State.

Having considered an example probability component, consider now an example method that the probability component can implement, in accordance with one or more embodiments.

Example Method

Figure 5:
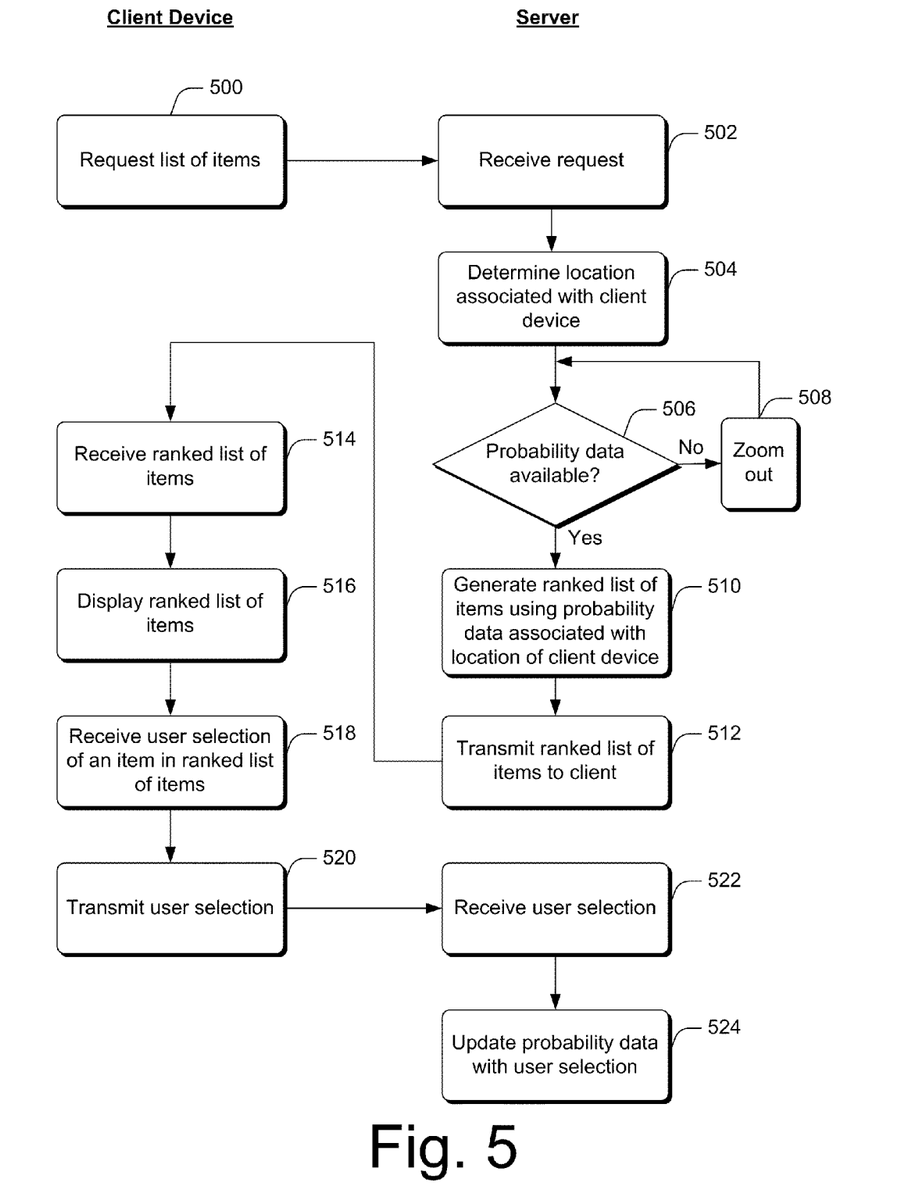
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware, or combination thereof. In at least some embodiments, aspects of the method can be performed by a client device, and other aspects of the method can be performed by a probability component, such as probability component 122, executing on a server, such as server 114 illustrated in FIG. 1.

Step 500 requests, from a server, a list of items. For example, a client device, such as device 102, can request a list of items through a navigation to a web page that includes an item display area in which items are displayed.

Step 502 receives, at the server, the request for the list of items. Step 504 determines a location associated with the client device. Location can be determined in a variety of different ways, including using a user-specified location, GPS data, or an IP address of the client device, to name just a few. Step 506 determines whether probability data is available for the particular location of the client device. If probability data is not available, step 508 zooms out to less specific locations until probability data is found. Examples of how this can be done are provided above. When probability data is available, step 510 generates a ranked list of items using the probability data associated with the location of the client device. As noted above, the ranked list of items can be tailored to the user's or client device's particular location. Step 512 transmits the ranked list of items back to the client device.

Step 514 receives the ranked list of items from the server. Step 516 displays the ranked list of items. Examples of how this can be done are provided above. Step 518 receives a user selection of an item in the ranked list of items. Step 520 transmits the user selection back to the server.

Step 522 receives the user selection and step 524 updates probability data based on the user's selection. For example, the probability component can update probability data by increasing the probability of a selected item in a list and decreasing the probability of other items in the list, as discussed above.

Having discussed an example method in accordance with one or more embodiments, consider now an example system that can be utilized to implement the embodiments described above.

Example System

Figure 6:
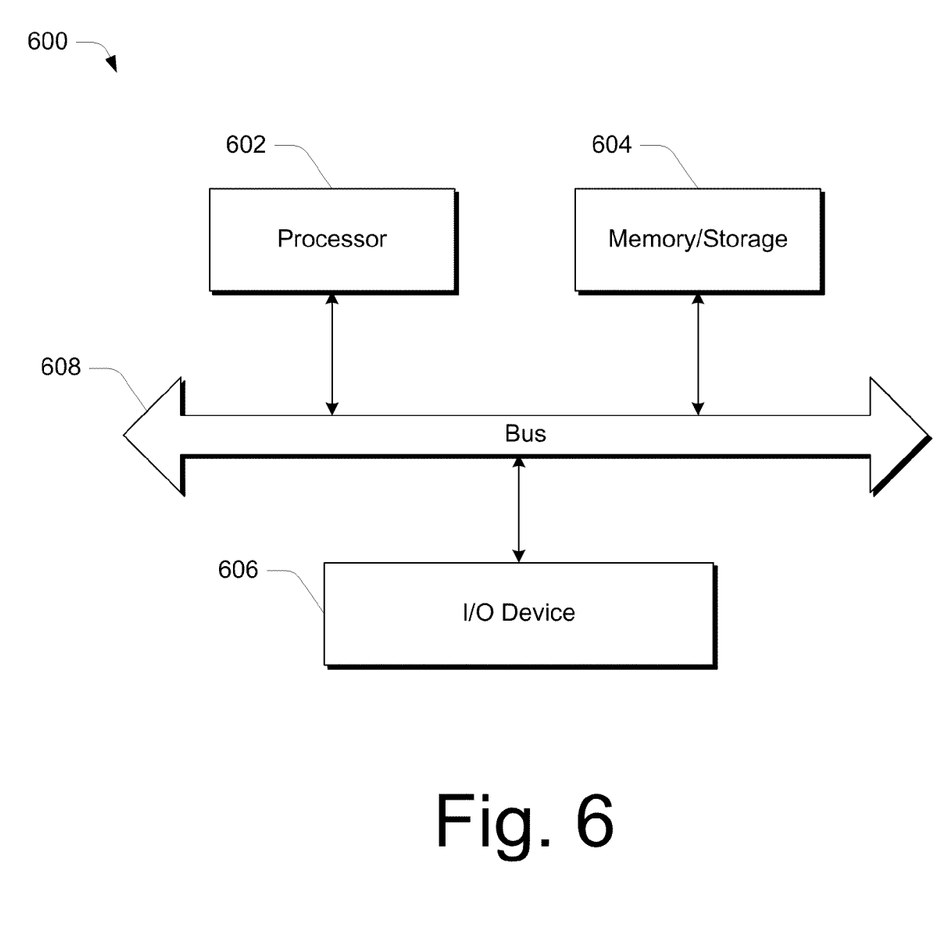
FIG. 6 is a block diagram of an example system that can be utilized to implement one or more embodiments.

FIG. 6 illustrates an example computing device 600 that can implement the various embodiments described above. Computing device 600 can be, for example, various computing devices or servers, such as those illustrated in FIG. 1 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments dynamically generate relevant items for a user based on a user's location and an item's popularity. In at least some embodiments, a probability component generates a ranked list of items that are relevant to users at a particular location using probability data associated with the list of items and the particular location. The probability data is based on user selections of items in the list of items.

In at least some embodiments, the probability component receives a request for a list of items from a client device and determines a location associated with the client device. The probability component then determines whether probability data for the list of items is available for the location associated with the client device. The probability data is based on selections of items in the list of items from sources other than the client device. Responsive to determining that probability data is available, the probability component generates a ranked list of items using the probability data associated with the location of the client device. The probability component then transmits the list of items to the client device for display.

In at least some embodiments, the probability component is configured to update probability data for items in a list of items based on user selections of items in the list. Responsive to receiving a user selection of an item in the list of items, the probability component increases a probability associated with the selected item and decreases probabilities associated with other items in the list of items.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter

What is claimed is:

1. One or more computer-readable storage media devices embodying computer executable instructions, which when executed by a computing device, perform a method, comprising:
    receiving, from a client device, a request for a list of items, the request being received automatically responsive to navigation of the client device to a website that includes an item display area for displaying relevant items in the list of items;
    determining a location associated with the client device;
    determining whether probability data corresponding to the location associated with the client device is available, the probability data based on previous user selections of items in the list of items from sources other than the client device, the probability data representing a measure of a likelihood that a particular item in the list of items will be selected by a probability component at the computing device when generating a ranked list of items;
    responsive to determining that probability data is not available, zooming out to a less precise location, the less precise location remaining within a region containing the location associated with the client device, to determine whether probability data is available at the less precise location;
    responsive to determining that probability data is available, selecting the probability data;
    generating the ranked list of items using the probability data;
    transmitting the ranked list of items to the client device;
    receiving, from the client device, a user selection of an item in the ranked list of items; and
    updating the probability data associated with the list of items using the user selection, the probability data being updated by at least increasing a probability associated with the selected item and decreasing probabilities associated with each of the other items in the list of items such that a total amount of decrease of the decreased probabilities is equal to an amount of increase of the probability of the selected item.

2. One or more computer-readable storage media devices as recited in claim 1, wherein updating the probability data includes updating the probability data associated with the list of items for one or more regions associated with the location associated with the client device.

3. One or more computer-readable storage media devices as recited in claim 1, wherein updating the probability data includes updating the probability data associated with the list of items in real time.

4. One or more computer-readable storage media devices as recited in claim 1, wherein the list of items comprises a list of social media websites.

5. One or more computer-readable storage media devices as recited in claim 1, wherein the probability data corresponding to the location associated with the client device is further based on selections of items from said sources having a same location as the location associated with the client device.

6. One or more computer-readable storage media devices as recited in claim 1, wherein determining a location associated with the client device includes determining a location using a user-specified location, GPS data, or an IP address of the client device.

7. One or more computer-readable storage media devices as recited in claim 1, wherein an increase of a probability associated with a particular item is further based on a quantity of previous user selections from a list of items.

8. A computer-implemented method comprising:
navigating, at a client device, to a website having a web page that includes an item display area for displaying items in a ranked list, the items including social media websites;
determining a location associated with the client device;
determining whether probability data corresponding to the location associated with the client device is available, the probability data based on previous user selections of items in the ranked list of items from sources other than the client device, the probability data representing a measure of a likelihood that a particular item in the ranked list of items will be selected;
responsive to determining that probability data is not available, zooming out to a less precise location, the less precise location remaining within a region containing the location associated with the client device, to determine whether probability data is available at the less precise location;
responsive to navigating to the website, automatically populating the item display area with the ranked list of items by at least:
  requesting, from a server, a list of social media websites;
  receiving, at the client device and from the server, a ranked list of social media websites, the ranked list of social media websites being ranked using the probability data;
  displaying, in the item display area of the web page, user-selectable items corresponding to one or more of the highest ranked social media websites in the ranked list;
receiving a selection of a user-selectable item displayed in the item display area; and
transmitting the user selection to the server to enable the server to increase an associated probability of the selected user-selectable item and decrease respective associated probabilities of each of the other user-selectable items in the item display area such that a total amount of decrease of the decreased probabilities equals an amount of increase of the probability of the selected user-selectable item.

9. The computer-implemented method as recited in claim 8, further comprising displaying one or more other user-selectable items corresponding to one or more of the social media websites in a scrollable display list.

10. The computer-implemented method as recited in claim 8, wherein the item display area is configured to display a limited number of user-selectable items corresponding to the social media websites.

11. A computer-implemented method comprising:
receiving, from a client device, a user selection of an item in a list of items;
receiving, from the client device, location information associated with a location of the client device; and
updating probability data associated with both the list of items and the location of the client device by at least:
  increasing a probability associated with a selected item for the location of the client device, the probability associated with the selected item being increased by an amount that is based on a number of previous user selections of the selected item by other users via other client devices at the location of the client device; and
  decreasing probabilities associated with all other items in the list of items for the location of the client device to cause a total amount of decrease of the decreased probabilities to equal an amount of increase of the probability of the selected item.

12. The computer-implemented method as recited in claim 11, wherein increasing the probability includes increasing the probability associated with the selected item for one or more regions associated with the location of the client device.

13. The computer-implemented method as recited in claim 11, wherein the list of items comprises a list of social media websites.

14. The computer-implemented method as recited in claim 11, wherein the probability data is based on selections of items from sources other than the client device.

15. The computer-implemented method as recited in claim 14, wherein the probability data is further based on selections of items from said sources having a same location as the location of the client device.

16. The computer-implemented method as recited in claim 11, wherein updating the probability data further comprises updating the probability data for multiple regions that are associated with the location of the client device and which each include a different level of granularity.

17. The computer-implemented method as recited in claim 11, wherein the amount of increase of the probability of the selected item is based on a number of previous selections of the selected item from sources associated with a same location as the location of the client device.

18. The computer-implemented method as recited in claim 11, wherein at least two of the decreased probabilities are decreased by different amounts, the different amounts being based on a respective number of previous selections of each item associated with the at least two decreased probabilities.

19. The computer-implemented method as recited in claim 11, wherein the probability data defines a measure of a likelihood that an associated item will be selected.

20. The computer-implemented method as recited in claim 11, further comprising:
determining whether probability data corresponding to the location of the client device is available; and
responsive to determining that the probability data corresponding to the location of the client device is not available, zooming out to a less precise location to determine whether probability data is available at the less precise location.

* * * * *